(No Model.) 2 Sheets—Sheet 2.
P. M. HAAS.
ROLLING MILL.
No. 293,165. Patented Feb. 5, 1884.
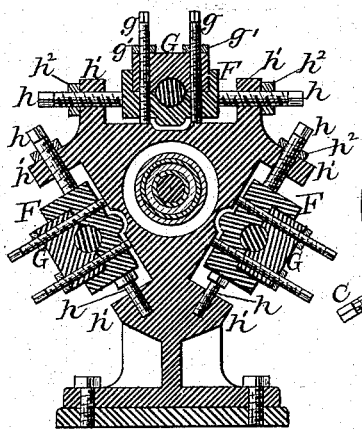
Fig. 6.
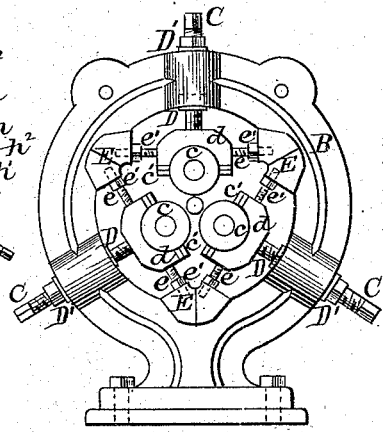
Fig. 5.
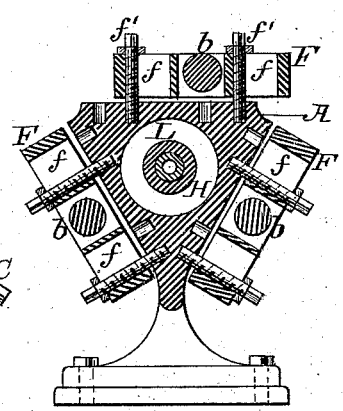
Fig. 7.
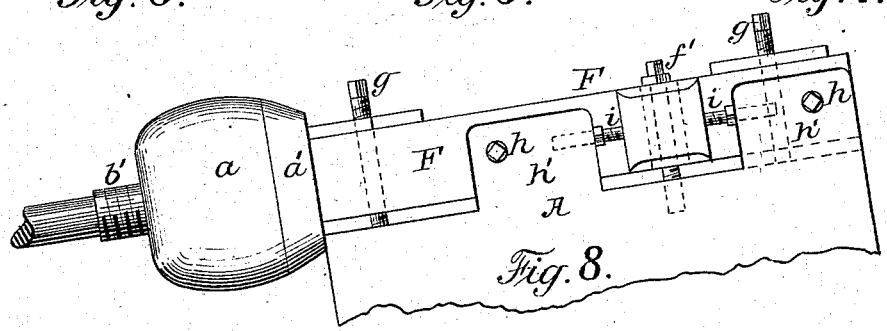
Fig. 8.
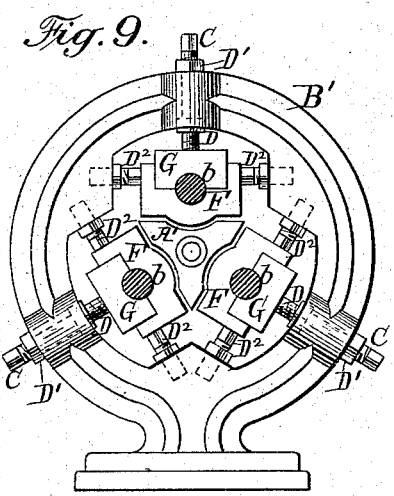
Fig. 9.
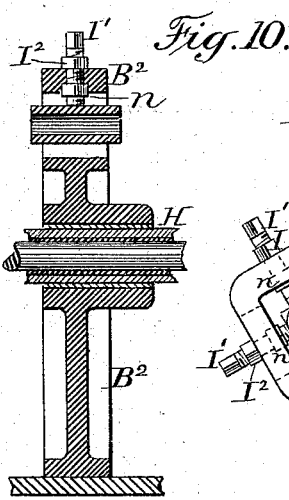
Fig. 10.
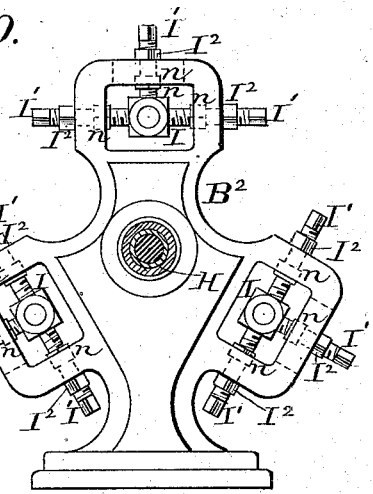
Attest:
Edmund Brodhag
Howell Barlett
Inventor:
Philip M. Haas
by his Attys
Johnson & Johnson

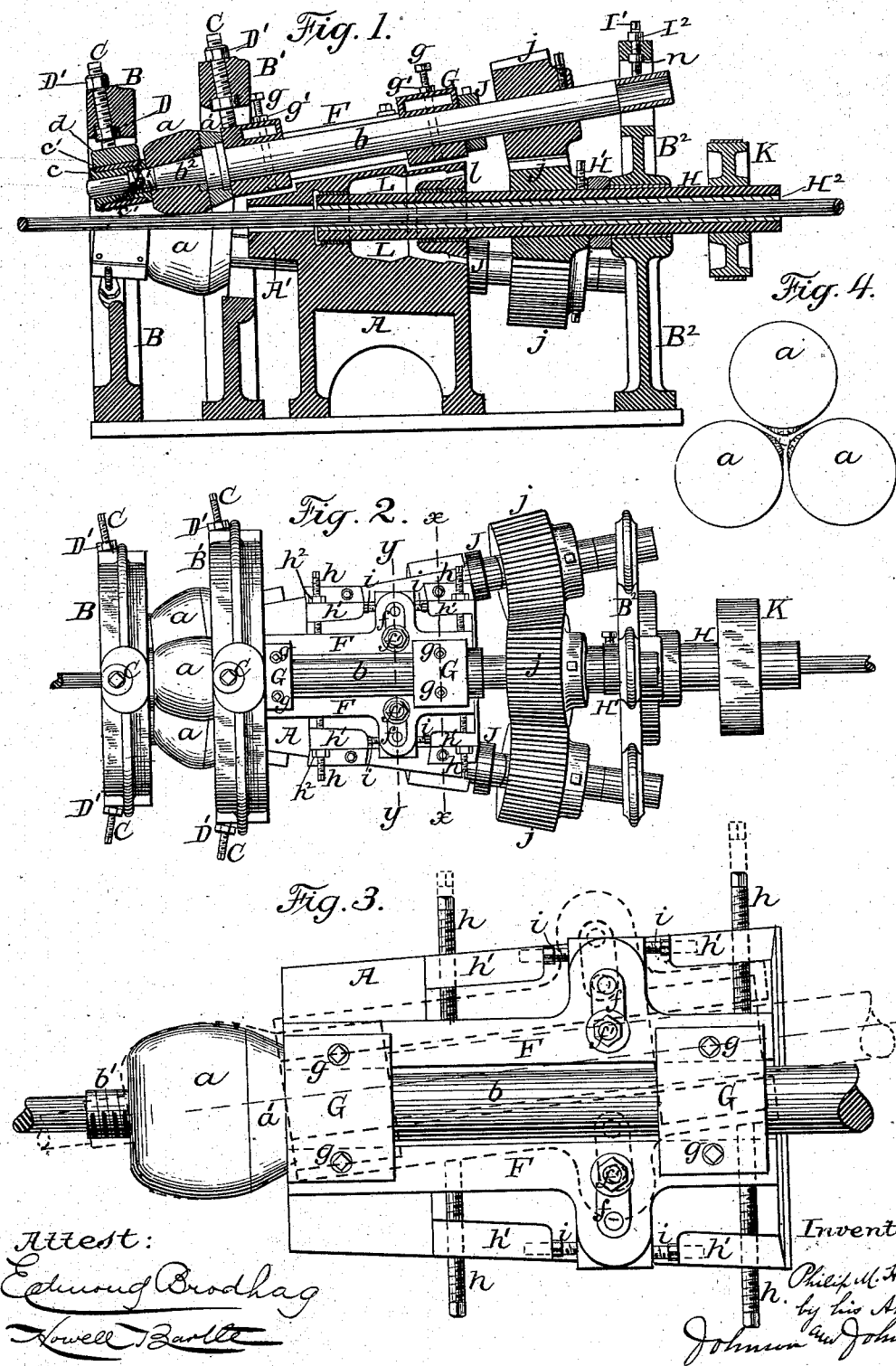

United States Patent Office.

PHILIP M. HAAS, OF YOUNGSTOWN, OHIO, ASSIGNOR OF ONE-HALF TO ANDREWS, BROS. & CO., OF SAME PLACE.

ROLLING-MILL.

SPECIFICATION forming part of Letters Patent No. 293,165, dated February 5, 1884.

Application filed April 14, 1883. (No model.)

*To all whom it may concern:*

Be it known that I, PHILIP MELANCTHON HAAS, a citizen of the United States, residing at Youngstown, in the county of Mahoning and State of Ohio, have invented new and useful Improvements in Rolling-Mills, of which the following is a specification.

My said invention relates to mills for rolling metal articles of cylindrical form in which the rolls are of tapering form and arranged in triangular relation to each other, their axial lines diverging from the same point and forming a central tapering space, so as to receive the article between them and feed it forward, compress it to the required diameter, and deliver it from the small ends of the rolls in a polished condition, as in the patent granted to Jonathan Ostrander, February 14, 1882.

My improvements are directed to a novel construction of the tapering rolls, by which the bar is reduced and polished between oval or convex surfaces, giving the advantage of greater reduction with less power than can be obtained from tapering rolls having straight surfaces from end to end. The rolls are adapted for removal from their shafts for replacement by others or for repairs. Provision is made whereby the rolls can be adjusted in the direction of the axis of the machine laterally in relation to each other and toward and from each other, the object being to set the rolls in proper relation to each other, and also to increase or diminish the space between them to suit the diameter of the bar to be rolled. These provisions for adjustment also adapt the rolls to be set in angular relation to each other, either singly or together, for the purpose of more rapidly feeding the bar while being rolled, as it is important to finish the bar while hot. The rolls being disposed in triangular relation to each other, and the outward force upon them being equally divided and constantly tending to spring and separate them, I provide against such separation and springing by means of housings having adjusting-screws arranged to support the shafts of the rolls at the inlet and at the outlet ends thereof and at the rear ends of the shafts. The bar is preferably operated upon in a heated condition, and is fed to the rolls through a revolving tube supported in suitable housings and caused to revolve in the same direction with the rolls. In order to prevent the undue heating of said feeding-tube and of the housings of the rolls, the bed-housing is provided with a chamber, through which a flow of cold water is maintained in contact with that end of the feeding-tube which has its bearing within the housing, so that the feeding-tube will be kept comparatively cool, and thereby prevent expansion, which might prevent the proper revolution of the tube, the function of which is to form a feeding-passage for the bar and to revolve it at the same time, so that when it enters the rolls it will be revolving in the same direction with the rolls. The rolls are geared at the feeding end of the machine, and for this purpose their shafts extend some distance beyond the rear end of the main housing, and consequently they are liable to spring or twist while in operation. To prevent any unequal strain upon the shafts and to support their overhanging geared ends, I provide an adjustable support therefor in such manner as to allow the rolls and their shafts to be adjusted as may be desired. The entrance end of the feeding-tube is preferably supported by the same housing within which the rear ends of the roll-shafts are supported, to secure the feeding-tube in proper relation to the machine.

The objects of my said improvements are to render the operation of the mill more effective in the important matters of reducing the bar, removing the scale, and polishing the bar, and of supporting the rolls in proper relation to each other, so as to resist the great strain to which they are subjected in such operation.

Referring to the accompanying drawings, I will now proceed to more particularly describe my improvements, and to point out the devices and combinations of devices claimed as my invention.

Figure 1 represents in vertical longitudinal central section a mill for rolling metal articles of cylindrical form embracing my said improvements. Fig. 2 represents a top view of the same, the rolls being shown set as diverging from the same point. Fig. 3 represents a top view, enlarged, of one of the bed-plates carrying one of the roll-shafts, in which the dotted lines show the position of the bed-plate when adjusted laterally, so that the three rolls do not diverge from the same point, as in Fig. 2. Fig. 4 shows the triangular relation of the rolls and the taper of the central space through which the bar is fed, reduced, and polished by the revolution of the rolls. Fig. 5 represents a front view of the housing and the adjustable boxes which support the roll-shafts at the delivering end of the machine. Fig. 6 represents a cross-section of the machine, taken on the line $x\ x$ of Fig. 2. Fig. 7 represents a similar section taken on the line $y\ y$ of Fig. 2. Fig. 8 represents a side view of one of the bed-plates and its roll. Fig. 9 represents a vertical cross-section taken in front of the main housing which carries the adjustable bearings for supporting the roll-shafts at the entering or diverging ends of the rolls. Fig. 10 represents in elevation and in section the housing and its bearings which support the rear ends of the roll-shafts and the entrance end of the feeding-tube.

The rolls $a$ are arranged outside of the main housing A at the delivering end of the machine. They are of tapering form, and they may be set so that their axial lines diverge from the same point; or they may be set to have angular relation to each other in which their axial lines will not diverge from the same point, so that their surfaces will form a slightly-tapering passage between them for the bar or article under operation. In any adjustment of the rolls it will be understood that the taper form of the rolls, their relation to each other, and their revolution in the same direction will effect the compound motion of the article being reduced—that is, a drawing movement through between the rolls and a rotary movement in the opposite direction to that of the rolls, so that all the parts revolve together in the operation of reducing the bar or tube and smoothing and polishing its surface at the same time.

While I have described the rolls as being of taper form, yet their reducing-surfaces are formed of arcs, so as to produce an oval or convex form, which I find in practice will require less power to operate the rolls, and will reduce the bar to a greater extent by reason of having less reducing-surface than rolls having their surfaces straight from end to end, and necessarily acting throughout the length of such surface. The rolls having convex surfaces, the area of their contact upon the bar being reduced is not changed in their adjustment, and the rolls will always have a bearing upon the bar between their receiving and delivering ends, but not at the ends, and thereby enlarge the area of the space between the rolls at their entrance, to give a free entrance to the bar and prevent the possibility of its striking upon the ends of the rolls in entering the reducing-space. The delivery of the bar from rolls having an enlargement of the reducing-space at their small ends avoids the objection of ringing or threading the surface of the bar as it emerges from the rolls. The rolls, however, may have a straight reducing part in the middle of their length, provided such straight part terminates at each end in a bevel or oval, to give the advantages due to the shortened reducing-surface and the enlarged areas of the ends of the space through which the rolls feed the bar in the operation of reducing and polishing it. The rolls are made of steel or chilled iron, and secured upon their shafts $b$, so as to be removed and replaced when required. For this purpose the shaft, which is also preferably of steel, is provided with a screw-thread, $b'$, Fig. 3, to receive a sleeve, $c$, provided with an interior screw-thread, and adapted to be screwed upon the end of the shaft against the small end of the roll, by which said roll is clamped upon a tapering part, $b^2$, of the shaft or against a shoulder or collar, $a'$, formed or shrunk thereon. In connection with the beveling or ovaling of the receiving ends of the rolls, the shoulder or collar forms a continuation of such beveling in the line of the surface of the roll, so that the three rolls and the shaft-collars $a'$ form a flaring or bell-shaped entrance for the bar as it emerges from the main housing, whereby it is guided between the rolls, so that the collars $a'$ form revolving guides to insure the entrance of the bar between the rolls. The rolls are keyed or otherwise secured, so as to prevent them from turning independent of their shafts. The fastening-sleeve $c$ serves also to form the bearing for the shaft, and is surrounded by a divided brass box, $c'$, within which it revolves. This bearing-sleeve $c$ is formed with circumferential end collars, between which the brass box is fitted, and by which it is secured in place, and as the screw upon the shaft is formed so as to tighten the sleeve by the turning of the shaft, the sleeve is therefore always bound hard against the end of the roll. The brass boxes $c'$ of the shafts $b$ are fitted in metal caps $d$, by which the shafts are supported in housings against the outward force due to the operation of reducing the bar, as shown in Fig. 5.

The means shown for supporting the caps $d$ consist of a metal ring-housing, B, having a suitable supporting-base, and three bosses equidistant upon the ring, which are pierced with radial openings to receive strong set-screws C, which are set up against the backs of the caps $d$, so as to support them and the rolls radially when the latter are adjusted. These set-screws C are provided with nuts D, seated so they cannot turn in recesses in the inner side of the ring-housing, as shown in Figs. 1 and 5, which sustain the outward force upon the screws, while jam-nuts D' on these screws, bearing upon the outer side of the said ring-housing, serve to secure the screws when set. Bosses E are also formed upon the inner circle of the housing in positions equidistant between the outer bosses, and they are pierced with screw-threads to receive strong set-screws $e$, in positions at right angles to the radial supporting-screws C, adapted to bear against the opposite sides of the caps, and provided with jam-nuts $e'$, bearing against the said inner bosses, E, whereby these set-screws $e$ support the caps sidewise when adjusted, the jam-nuts $e'$ serving to prevent said set-screws $e$ from working loose, which otherwise they would be liable to do and disarrange the adjustment of the rolls. This arrangement of screws gives a firm support to the ends of the shaft outside of the delivering ends of the rolls, and a very convenient and effective means by which the shafts can be loosened when it is desired to adjust the rolls; but these set-screws do not form the adjusting devices for the roll-shafts. A similar housing, B', provided with like supporting-screws, is arranged to support the shafts at the entering ends of the rolls, and a similar housing, B², provided with adjusting devices, is arranged to support the rear or diverging ends of the shafts, whereby they are supported in every direction with the same firmness, which, in rolls arranged in diverging lines and adapted by such arrangement to feed and to reduce the bar in its passage through a tapering space, is of vital importance. In the patented mill herein referred to, the want of such supports independent of the adjusting devices was developed in the use of such mill, as the outward force due to the reducing of the bar tended to spring the shafts, and thereby to vary the diameter of the finished bar. Each roll-shaft is mounted in bearings in bed-plates F, in which the shafts are confined by box-caps G, and the bed-plates F are adjustably secured to the main housing A, which is preferably a single casting formed with flat-faced sides for the bed-plates, which diverge from the roll ends of said shafts in planes parallel with the axial lines of the rolls and form a triangular body in cross-section. These bed-plates are provided with transverse slots $f$, near the shaft-bearings at their rear ends, through which slots cap-screws $f'$ pass into threaded holes in the housing A, by which the bed-plates are fastened down upon the housing, as shown in Figs. 3 and 7.

The confining-box caps G for the shafts are provided with set-screws $g$, which pass through said caps into screw-threaded holes in the bed-plates F, and rest upon the flat sides of the housing, as shown in Fig. 6, whereby the roll-shafts are adjusted toward and from each other, to adjust the rolls to suit the reducing-space to different diameters of bars. Jam-nuts $g'$ upon these adjusting-screws serve to secure the caps G upon the bed-plates to confine the shafts.

Provision is made for crosswise adjustment of the roll-shafts, to set them in proper triangular relation upon lines diverging from the same point, or to set any one of the roll-shafts in angular relation to the others, so that the axis of one of said roll-shafts shall depart from the point of convergence of the others, for the purpose of increasing the speed of the feed of the bar when desired, as in rolling long bars of small diameter. This varied capacity for the adjustment of the roll-shafts enables the rolls to be set to suit the work and the desired rapidity of the feed. This crosswise adjustment is effected by means of screws $h$, threaded through projections $h'$ on the flat sides of the bed-housing, and bearing against the opposite sides of the bed-plates F at points as near as possible to the confining-boxes G of the shafts, there being jam-nuts $h^2$ on the screws $h$ bearing against the outer sides of said projections $h'$, to hold the screws when set. It is for this adjustment that the cross-slots $f$ are made so as to allow the bed-plates to be moved over the adjusting-screws $f'$, as shown in Fig. 3. These slots $f$ are long enough to allow for the limit of the angular adjustment of the rolls, and they are wide enough to allow for the lengthwise adjustment of the roll-shaft carrying bed-plates over the screws $f'$. This lengthwise adjustment is effected by means of screws $i$, Figs. 3 and 8, threaded into the ends of the housing projections $h'$, and adapted to bear upon the opposite sides of the projections on the opposite sides of the bed-plates. The cross-slots $f$ referred to are made in these bed-plate projections, and when the bed-plates are adjusted in angular relation to each other the screws $f'$ are placed into holes in the housing, so that one screw will be at the inner end of one slot and the other at the outer end of the other slot, as shown in Figs. 3 and 7. It is important to notice that this arrangement of adjusting-screws relieves them from the direct force exerted upon the rolls, and they are therefore separate and distinct from the supporting devices for the roll-shafts, which very materially increases the durability of the machine.

Referring to the ring-housing B', by which the roll-shafts are supported against the outward force at the inner ends of the rolls, the radial screws C are arranged to bear upon the box-caps G, which confine the roll-shafts to the bed-frames, as shown in Fig. 9, said screws being provided with nuts D D', arranged upon the inner and upon the outer sides of the ring-housing, as in the front ring-housing, and for the same purpose. Screws D² are tapped into bosses on the inner side of the ring-housing B', in positions at right angles to the radial screws, and bear upon the opposite sides of the bed-plates to give the required sidewise support to the front ends of the bed-plates, and necessarily to the roll-shafts at this point.

The housing B², which supports the rear overhanging ends of the roll-shafts, is shown in Fig. 10, and it also forms the support for the outer end of the tube H, through which the article is fed to the rolls. This housing B² is formed with spaces to receive boxes I for the roll-shafts, and these boxes are supported on three sides by strong screws I', two of which pass through screw-threaded openings in the housing, one for each box being radial to the central space formed by the rolls, and the two others of the three are at right angles to the radial screw. The radial screws I' pass through slots in the housing, so as to accommodate the angular adjustment of the shafts in relation to each other to set the rolls, as stated, and for this purpose said radial screws have jam-nuts $n$, as shown, on the inner side of the housing-space, to sustain the outward pressure upon these ends of the roll-shafts. In adjusting and setting the roll-shafts these screws are loosened, and when the shafts are set as required the screws are again set up against the boxes, and when so set are secured by the jam-nuts $I^2$ on the outer side of said housing. The roll-shafts so mounted are provided with adjustable collars J, secured by set-screws, which, when the shafts are set longitudinally, are moved on them against the rear sides of the rear boxes, G, so as to support the shafts against the forward pulling force exerted upon the rolls when in operation.

The bed-housing has a cylindrical opening in line with the reducing-space between the rolls, and in this opening the feeding-tube H is fitted in suitable bearings. It does not extend through the housing; but the latter is preferably formed with a frontward-projecting nose, A', which extends to near the receiving end of the space between the rolls, and the feeding-tube preferably terminates short of this nose, the cylindrical opening in which is of a diameter equal to that of articles to be rolled having the greatest diameter. Over this nose projection the inner ends of the bed-plates extend into the central space of the ring-housing B', which supports the roll-shafts at the receiving ends of the rolls, while the rear ends of the bed-plates extend to the rear end of the bed-housing. These bed-plates have a thickness of about four inches, and they are recessed or open in the middle to receive the roll-shafts and to allow for the escape of dirt, as shown in Figs. 1 and 7. As stated, the rear or receiving end of this feeding-tube is supported in the housing $B^2$ for the rear ends of the roll-shafts, and said tube is, when properly fitted in its bearings, confined in position longitudinally by an adjustable collar, H', fastened upon it by a screw in position against the inner side of the rear housing, $B^2$, the bearing in which is formed by a long hub, as shown in Figs. 1 and 10. The receiving end of this feeding-tube extends a suitable distance beyond the rear housing to receive a pulley, K, or gear, by which said tube is revolved by any suitable motor. This driving-pulley should be about forty inches in diameter, with a ten-inch face.

The rotary feeding-tube is a permanent part of the mill, and is adapted for bars of the largest diameter which can be reduced by the rolls; but I provide for feeding and supporting smaller bars or tubes for operation by the same rolls (by reason of the capacity of the latter for adjustment) by means of tubes or bushings $H^2$, of different interior diameters, adapted to be fitted within the permanent tube H, and to receive and support the article to be revolved by it by means of the permanent feeding-tube. In this way the feeding-tube is adapted to support articles of different diameters and to suit the adjustment of the rolls to properly reduce such articles. This permanent revolving feeding-tube is made the means of operating the reducing and polishing rolls through spur-gears $j$, fixed on the overhanging ends of the roll-shafts, meshing with a similar gear on the said permanent feeding-tube. This gear is arranged between the rear end of the bed-housing and the rear housing, $B^2$, for the roll-shafts, and the rotation of the feeding-tube is in a direction opposite to that of the rolls, which are revolved together in the same direction, and which effects thereby the revolution of the article operated upon in the same direction as that in which the feeding-tube is revolved. While, therefore, the rolls are operated directly from the tube through which the article being treated is fed, the said tube is caused to revolve in the same direction in which the article is turned by the rolls, and thereby to co-operate not only in supporting and guiding the article in its passage to and through said rolls, but in reducing the friction of the article as it is drawn through the tube by the joint action of the tapering rolls.

It will be understood that the taper form of the rolls, their relation to each other, and their revolution in the same direction effect the compound motion of the article—that is, a drawing movement through the central passage formed by the rolls and a rotary movement in the opposite direction to that of the rolls, so that all the parts revolve together in the operation of reducing the bar or tube and simultaneously polishing and removing the scale from its surface.

In Fig. 4 I have shown the taper form of the space between the three rolls through which the bar is fed in being reduced, and in Fig. 1 is shown in center section only the relation of the axial line of one of the rolls to the axial line of the bar being reduced. The axial line of the other rolls, however, has the same relation to the axial line of the bar.

Referring now to the form of the rolls, I find an oval or convex surface in a taper roll to give a greater amount of reduction to the bar and to feed it faster than can be obtained with straight-surfaced rolls. I find such convex taper form advantageous in giving less reducing-surface, and therefore requiring less power to operate the rolls. I find that such form of rolls gives a better polish to the surface of the bar and more effectually removes the scale and gives a better finish to the bar. I find that such form of roll gives the advantage of having it comparatively short and the actual reducing-surface in contact with the bar of the least area consistent with a proper reduction and a fast feed. I find that in such form and arrangement of rolls the relation of their reducing-surfaces is not changed in the adjustment of the rolls, and that in this particular such form is of great advantage in connection with the capacity of the rolls for reducing bars of different sizes.

It will be understood that the adjustment of the rolls to suit bars of different diameters is not effected by adjusting their shafts lengthwise upon the main housing, as in said patent referred to, but that such adjustment is only to properly line the rolls, so that their points of greatest diameter will be in line transversely.

In rolling hot polished shafting the feeding-tube and the several parts of the mill are liable to become unduly heated and the feeding-tube to bind in its bearings. I provide against this radiation of the heat by forming a chamber, L, within the bed-housing, so as to surround the inner tube therein, and through this chamber and in contact with the tube cold water is caused to flow continuously, entering at one point, l, and leaving at another. For this purpose the bearings of the revolving feeding-tube are provided with brass bushings, to render them as tight as possible. A brass bushing is also provided for the feeding-tube in the rear housing. The several housings are firmly bolted to a suitable bed. The rolls are about nine inches at their greatest diameter, about six inches long, and preferably of polished steel.

In Fig. 1 the bar is shown as being fed within a removable tube or bushing placed within the permanent feeding-tube, and such removable tubes or bushings may be of different interior diameters for the purpose stated, and split lengthwise to facilitate their insertion and withdrawal within and from the permanent feeding-tube, and to cause them to fit and be revolved by said tube.

The finished bar may, if desired, be delivered through a revolving or non-revolving tube, suitably supported at the delivering ends of the rolls by screws and bushings.

In adjusting the rolls in angular relation to each other, one of the screws $f'$ of each bed-plate is removed from the inner hole of the bed-housing and screwed into the outer hole, as shown by dotted lines in Fig. 3, and the screws in the several housings which support the roll-shafts having been properly loosened, the several bed-plates can then be set by the transverse screws, so as to bring the rolls in angular relation to each other—that is, with their axes in such relation that their axial lines will cross each other, but not diverge from the same point.

In Fig. 1 the rolls are shown as set with their axes diverging from the same point, and from this set they can be changed more or less, as stated, by screwing in some of the transverse screws and unscrewing some of the others, using for this purpose a connection for such screws with fixed parts of the bed-housing, and thereby swiveling the bed-plates, as it were, upon a pivot, the center of which is the middle of the roll lengthwise. This adjustment can be made either to the right or to the left, and thus equalize the wear of the rolls while obtaining the advantages stated. In fact, the rolls can be adjusted in any direction, firmly supported in any adjustment, and produce a polished shaft having as near as it is possible to produce by rolling an equal diameter throughout its length.

Provision is made for keeping the gear-wheels $j$ in mesh when their shafts are adjusted radially from their normal position by moving said gear-wheels upon their shafts toward the main housing and securing them by screws.

I claim—

1. The metal-reducing rolls, arranged in divergent direction, each rounded at their edges and comprehending a beveled collar or shoulder, $a'$, combined with a shaft provided with a screw-thread, $b'$, a screw-sleeve bearing, $c'$, matching the screw $b'$, and a centrally-arranged feeding-tube, H, substantially as described, for the purpose specified.

2. The metal-reducing rolls and their shafts, arranged in divergent direction, in combination with the main housing A, a central feeding-tube supported thereby, the separate housings B B' B², and means, substantially such as described, arranged within the said housings, whereby said roll-shafts are supported and may be adjusted in the several directions stated at one or at both ends within said housings, substantially as described, for the purpose specified.

3. The combination of the rolls arranged in divergent direction, the bed-plates carrying said roll-shafts, provided with cross-slots $f$, the main housing A, and a central feeding-tube, with means, substantially such as described, whereby the said bed-plates, with their roll-shafts, are adjusted crosswise to adjust the rolls in relation to each other, for the purpose specified.

4. The combination of the metal-reducing rolls, having their shafts arranged with their axial lines diverging, with the main housing, a centrally-arranged feeding-tube, H, the separate supporting-housings for the roll-shafts, the bed-plates F, provided with the cross-slots $f$, the clamping-screws $f'$, and the screws $g\ h\ i$, arranged to act upon the main housing to adjust the bed-plates to set the rolls in relation to each other, substantially as described, for the purpose specified.

5. The metal-reducing rolls, arranged in divergent direction, said rolls having the edges of their ends rounded or beveled, combined with the main housing A, a central feeding-tube, H, the separate housings B B' B² for the shaft-bearings, the bed-plates F, and the screws $f'\ g\ i$, whereby the roll-carrying bed-plates are adjusted in the direction of the axis of the machine to properly line the rolls transversely, and to adjust said bed-plate radially in relation to said axis to increase and diminish the space between said rolls, substantially as described, for the purpose specified.

6. The combination, with the main housing A and a feeding-tube, H, centrally arranged therein, of the reducing-rolls having their shafts arranged with their axial lines diverging, the bed-plates F, adjustably secured to the main housing, and the separate housings B B' B², each provided with adjustable bearings for the roll-shafts, whereby the roll-shafts and their bed-plates are carried and supported out of contact with the said main housing, substantially as described, for the purpose specified.

7. The combination, in a mill for rolling metal articles of cylindrical form, with the reducing-rolls arranged in divergent direction, the main housing A, and a central feeding-tube, H, for the article being reduced, of the chamber L in said housing, through which cold water may be caused to flow over and around that part of said feeding-tube which has its bearing within said housing, substantially as described, for the purpose specified.

8. In a rolling-mill, the combination, with the main housing A, having the surface projections $h'$, and the central feeding-tube, H, and the rolls, of the bed-plates F for the roll-shafts, having side projections, and the screws $i$, threaded into said housing projections, and adapted to bear upon the bed-plate projections, all constructed and arranged for operation as described.

9. The combination, in a rolling-mill, of the main housing A, having the nose $A'$, the central feeding-tube, H, and the rolls, the bed-plates, within which the roll-shafts are mounted, the several screws for securing and adjusting the bed-plates upon said main housing, and the separate housings B B' $B^2$, within which the roll-shafts are mounted, each provided with boxes supported upon screws for adjustment in any direction, substantially as described, for the purpose specified.

In testimony whereof I have hereunto set my hand in the presence of two subscribing witnesses.

PHILIP M. HAAS.

Witnesses:
A. E. H. JOHNSON,
J. W. HAMILTON JOHNSON.